United States Patent [19]

Hoppie et al.

[11] Patent Number: 4,669,433

[45] Date of Patent: Jun. 2, 1987

[54] REGENERATIVE FUEL HEATING APPARATUS AND METHOD FOR HYPERGOLIC COMBUSTION

[75] Inventors: Lyle O. Hoppie, Birmingham; Richard Chute, Troy; David H. Scharnweber; Kenneth P. Waichunas, both of Milford, all of Mich.

[73] Assignee: Eaton Corporation, Cleveland, Ohio

[21] Appl. No.: 812,863

[22] Filed: Dec. 26, 1985

[51] Int. Cl.$^4$ .................... F02M 31/18; F02M 27/02
[52] U.S. Cl. .................................. 123/276; 123/538; 123/558; 123/668
[58] Field of Search ............... 123/536, 537, 538, 557, 123/558, 276, 668, 297

[56] References Cited

U.S. PATENT DOCUMENTS

| 756,834 | 4/1904 | Denison | 123/557 |
|---|---|---|---|
| 771,881 | 10/1904 | Morrison | 123/557 |
| 1,262,886 | 4/1918 | Wemple . | |
| 1,292,653 | 1/1919 | Saul | 123/557 X |
| 1,347,631 | 7/1920 | Herck . | |
| 1,876,168 | 9/1932 | Richardson . | |
| 2,108,706 | 2/1938 | Crillon . | |
| 2,110,062 | 3/1938 | Gibson . | |
| 2,166,266 | 7/1939 | Schmitt . | |
| 2,407,729 | 9/1946 | Taylor . | |
| 2,418,175 | 4/1947 | Higginbotham . | |
| 2,435,213 | 2/1948 | Hancock . | |
| 2,586,278 | 2/1952 | Waters . | |
| 2,667,605 | 1/1954 | Massier . | |
| 2,744,507 | 5/1956 | Huber | 123/297 X |
| 2,831,468 | 4/1958 | Witzky | 123/276 X |
| 2,855,770 | 10/1958 | Grube . | |
| 2,999,534 | 9/1961 | Wagner . | |
| 3,044,284 | 7/1962 | Kratzenberger . | |
| 3,082,752 | 3/1963 | Thomas | 123/668 |
| 3,191,659 | 6/1965 | Weiss . | |
| 3,243,631 | 3/1966 | Clark . | |
| 3,299,675 | 1/1967 | Laffitte et al. . | |
| 3,518,036 | 6/1970 | Staats et al. . | |
| 3,681,002 | 8/1972 | Weller et al. . | |
| 3,762,378 | 10/1973 | Bitoni | 123/557 X |
| 3,765,382 | 10/1973 | Vandenberg . | |
| 3,945,352 | 3/1976 | Reimuller | 123/558 X |
| 4,201,167 | 5/1980 | Bayley . | |
| 4,267,976 | 5/1981 | Chatwin | 123/538 X |
| 4,503,833 | 3/1985 | Yunick . | |
| 4,582,475 | 4/1986 | Hoppie | 123/538 X |

FOREIGN PATENT DOCUMENTS

| 451769 | 11/1927 | Fed. Rep. of Germany . | |
| 2800894 | 7/1979 | Fed. Rep. of Germany | 123/557 |
| 787893 | 9/1935 | France | 123/538 |
| 26974 | of 1911 | United Kingdom . | |

OTHER PUBLICATIONS

"The Influence of Initial Fuel Temperature on Ignition Delay", Hoppie, SAE paper 820356.
"Hypergolic Combustion in an Internal Combustion Engine", Scharnweber et al., SAE paper 850089, Feb. 25–Mar. 1, 1985.

Primary Examiner—Tony M. Argenbright
Attorney, Agent, or Firm—J. Gordon Lewis; John R. Benefiel

[57] ABSTRACT

An apparatus and method are disclosed for pretreatment of fuel prior to injection into the combustion chamber of a combustion device such as an internal combustion engine comprising heating of the fuel to a sufficiently high temperature to activate the fuel molecules to a critical degree enabling "hypergolic" combustion, i.e., combustion without significant ignition or combustion delay. The fuel is circulated through a vessel passing through the combustion chamber which is insulated to reduce heat loss such as to regeneratively preheat the fuel to a temperature on the order of 1000° F. Regenerative heating of the fuel is alternatively combined with a catalytic treatment of the heated fuel to partially activate the fuel molecules to reduce the heating necessary to achieve hypergolic combustion.

1 Claim, 5 Drawing Figures

REGENERATIVE FUEL HEATING APPARATUS AND METHOD FOR HYPERGOLIC COMBUSTION

BACKGROUND OF THE INVENTION

1. Field of the Invention.

The present invention concerns combustion devices such as internal combustion engines, and more particularly, a system and method for pretreating fuel to achieve so called "hypergolic" combustion, i.e., combustion in which only negligible ignition delay occurs after the fuel comes into contact with oxygen in a combustion chamber and combustion is completed substantially instantaneously.

2. Description of the Prior Art.

It has long been known to preheat fuels in internal combustion engines, as an aid in achieving rapid vaporization and combustion. See for example U.S. Pat. Nos. 4,503,833; 3,765,382; 2,435,213; and 1,262,886.

Such preheating has also been employed for cracking of heavy components in the fuel, as described in U.S. Pat. No. 2,108,706.

Such preheating has in some instances taken the form of a heat exchanger located in the engine exhaust system, as shown in U.S. Pat. No. 3,765,382 and, there is also disclosed in German Pat. No. 451,769, a heat exchanger coil provided in the cylinder head of a piston engine in order to cause preheating of the fuel.

In U.S. Pat. No. 1,262,886 a "retort" is provided in which hot combustion gases are used to heat an incoming quantity of fuel. Such preheating has been limited to moderately high temperatures sufficient only as an aid to rapid vaporization of the fuel and no striking effect on the combustion process by preheating of fuel has been appreciated by those skilled in the art.

There is disclosed in U.S. Pat. No. 4,448,176; SAE paper no. 850089, "Hypergolic Combustion in an Internal Combustion Engine"; and SAE paper no. 820356, "The Influence of Initial Fuel Temperature on Ignition Delay", each of which is hereby incorporated by reference, a concept for reducing ignition delay to negligible values and completion of the combustion process substantially instantaneously after bringing fuel into contact with oxygen containing atmosphere. This is achieved by heating fuel to relatively elevated levels, i.e., to a temperature on the order of 1000° F. Such fuel preheating produces the striking effect of enabling substantially instantaneous ignition and combustion, i.e., "hypergolic" combustion upon bringing the pretreated fuel into contact with an oxidizer.

As disclosed in these references, by preheating fuel to such very high temperature levels, a disproportionate number of fuel molecules are excited to elevated energy states, causing dissassociation of the fuel molecules to produce hydrogen and hydrocarbon radicals. In heating fuel to the 1000° F. range, a critical proportion of fuel molecules are excited, such that it has been found that combustion will be initiated and completed substantially instantaneously upon bringing the preheated fuel into an oxidizing atmosphere, such as compressed air in the combustion chamber of an internal combustion engine. This proportion has been computed theoretically to be approximately $3 \times 10^{-5}\%$ of the total number of molecules in each quantity of fuel.

As described in the aforementioned references, there are many advantages to the reduction of ignition delay to negligible levels and the achievement of instantaneous combustion, since control over the combustion cycle is thereby enabled.

However, the use of external heat sources for such purpose adversely affects the efficiency of the engine when heating fuel to such highly elevated temperatures. Further, the heat exchanger arrangements heretofore disclosed in the prior art do not enable the degree of heating necessary to accomplish hypergolic combustion.

It is furthermore a general disadvantage of internal combustion engines that an inordinately high proportion of the heat generated is lost, in no small part by conduction through the engine parts forming the combustion chamber.

Accordingly, it is an object of the present invention to provide a regenerative fuel heating system and method for combustion devices, which enables fuel to be heated to elevated levels on the order of 1000° F. such as to enable hypergolic combustion.

It is still another object of the present invention to improve the efficiency of internal combustion engines by reducing the amount of waste heat lost by the engine during operation.

SUMMARY OF THE INVENTION

These and other objects of the present invention are accomplished by providing a heat exchanger arrangement in which fuel is directed through a vessel disposed within the combustion chamber itself, such as to be in direct contact with the products of combustion, maximizing heat transfer into the fuel for heating purposes.

The combustion chamber is also lined with an insulating layer such as to reduce the conduction of heat out of the combustion chamber, to further increase the available heat for heating of the fuel as described.

Fuel may also be first partially preheated by passing the fuel through a heat exchanger located in the engine exhaust system to make use of the waste heat dissipated by the combustion gases passing out through the engine exhaust system to more readily achieve heating of the fuel to an elevated temperature prior to its injection into the combustion chamber.

The fuel vessel may take the form of a generally spiral array of thin wall metal tubing mounted to the cylinder head firedeck directly beneath an insulating layer.

A finned heat exchanger body may also be alternatively employed, mounted to protrude directly into the combustion chamber, received within a recess formed in the piston face as the piston approaches top dead center (TDC).

In order to further enhance the pretreatment of fuel to achieve elevation to a high energy state of the critical proportion of the molecules, contact of the heated fuel with a catalytic material is carried out in conjunction with the regenerative heating of the fuel. Such contact may be achieved by passing the regeneratively heated fuel through a porous mass of catalytic material, just prior to injection.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
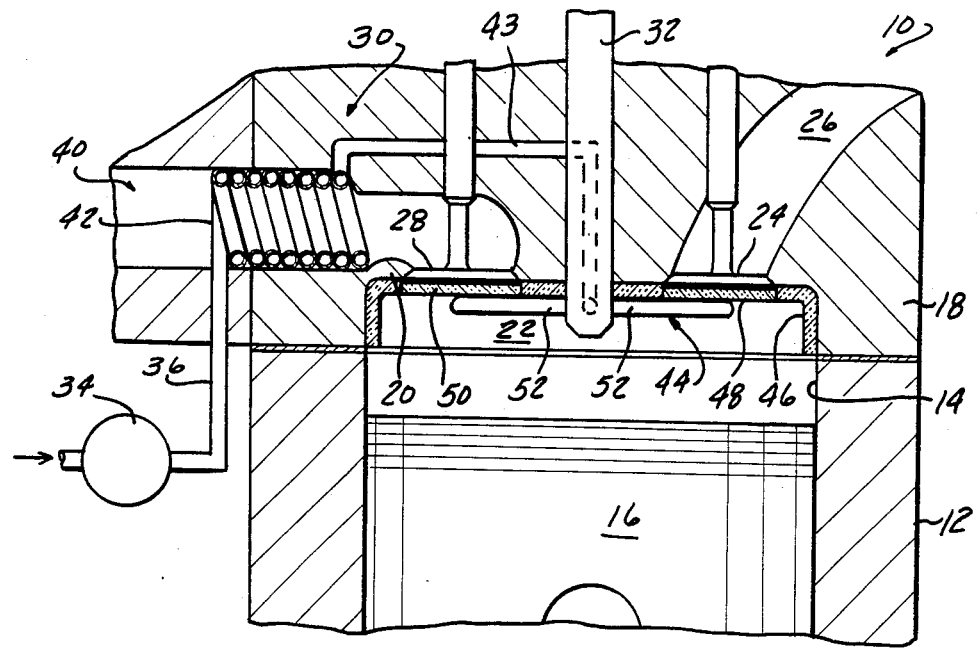
FIG. 1 is a fragmentary partially sectional view of an engine incorporating a regenerative fuel heating system according to the present invention.
Figure 2:
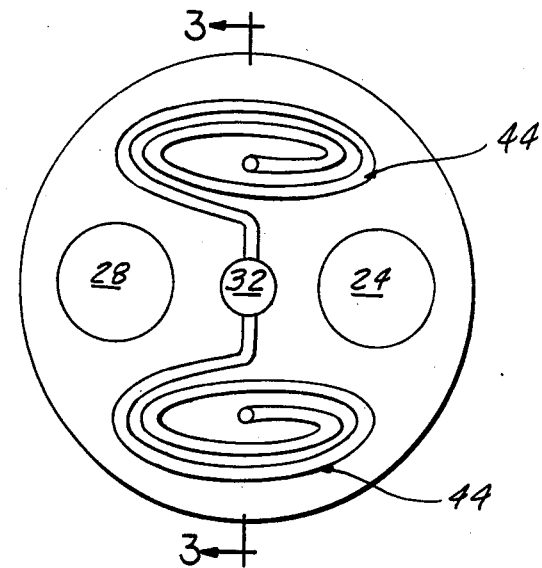
FIG. 2 is a plan view of the engine cylinder as shown in FIG. 1 depicting the arrangement of fuel containing tubing in the combustion chamber.
Figure 3:
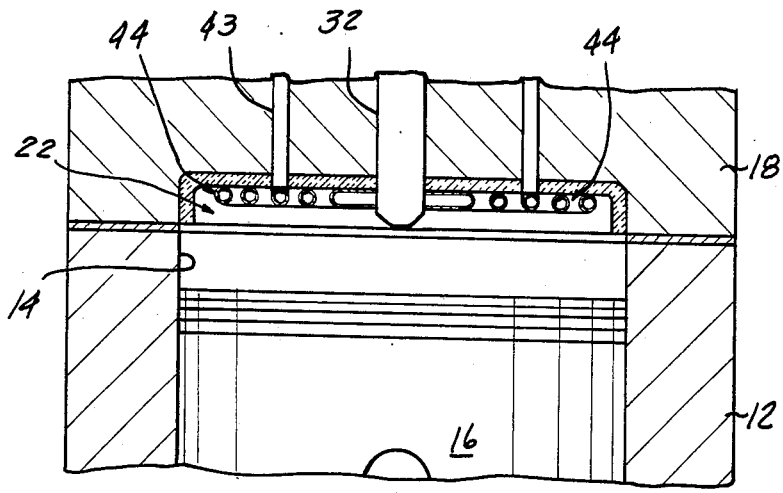
FIG. 3 is a view of the section 3—3 taken through the tubing arrangement shown in FIG. 2.

Referring to the drawings and particularly FIGS. 1-3, an internal combustion engine 10 is depicted as a single cylinder of a reciprocating piston internal combustion engine, with a cylinder block 12 having a cylinder bore 14 formed therein, and in which is received a piston 16, reciprocated by a crankshaft (not shown). A cylinder head 18 is formed with portions 20 that, together with the piston 16 and bore 14, define a combustion chamber 22.

An intake valve 24 controls the intake of air through air intake passage 26 to the combustion chamber 22, and an exhaust valve 28 controls outflow of the products of combustion into an engine exhaust system 30.

Each of the intake valve 24 and exhaust valve 28, are opened cyclically by valve operating mechanisms (not shown), on respective valve seats to allow the admission of air and expulsion of exhaust during each combustion cycle, and to be closed to allow the combustion chamber to be sealed and the air therein to be compressed by movement of the piston 16 to top dead center in a manner well known to those skilled in the art.

Fuel injector nozzle 32 is adapted to inject the fuel into the combustion chamber 22, for combustion in the compressed air contained therein during each combustion cycle.

According to the concept of the present invention, the fuel is heated to very elevated temperatures, i.e., on the order of 1000° F., to achieve activation of the critical proportion of fuel molecules to enable hypergolic combustion of the fuel upon introduction into the combustion chamber 22. That is, as each charge of fuel is injected into the combustion chamber 22, it will be ignited and be combusted substantially instantaneously upon coming into contact with the compressed air in the combustion chamber, as detailed in aforementioned U.S. Pat. No. 4,448,176 and other references cited.

According to the present invention, the means for heating the fuel to such temperature comprises a regenerative heat exchanger system in which heat generated by combustion during previous cycles is transferred into the incoming fuel received from a fuel supply means 34.

According to one aspect of the present concept, a two-stage heating of the incoming fuel prior to injection is utilized in order to raise the temperature to the very elevated levels necessary for hypergolic combustion. Thus, fuel is caused to flow through a heat exchanger which is disposed in the exhaust system passage 40, preheating fuel by heat extraction from the exhaust gas passing out from the combustion chamber 22 after each combustion cycle.

The heat exchanger may take the form of a coil 42 of thin wall metal tubing and disposed in the exhaust passage 40 such as to be preheated by the hot exhaust gases flowing thereover, which in effect allows recapturing of the residual portion of the heat contained in the exhaust gases. After passing through the coil 42, the fuel then passes through conduit 43 to a fuel carrying vessel comprised of one or more convoluted arrays 44 of thin wall tubing located in the interior of the combustion chamber 22, to thus be directly contacted by the products of combustion in the combustion chamber which are at the highest temperatures occurring during the combustion process.

The tubing in coil 42 and arrays 44 is formed of a suitable alloy to withstand the high temperatures encountered, such as Inconel.

Each of the tubing arrays 44 has an outlet connected to the injector 32 as shown in FIGS. 1 and 2. Each array 44 is mounted adjacent to the surfaces of the cylinder head portions 20 located adjacent to the exhaust valve 28 and intake valve 24 and injector 32 in the available space therebetween.

In order to maximize the temperatures in the combustion chamber to enhance the quantity of heat transferred into the fuel, and to reduce the loss of heat by conduction into the cylinder head 18, a thermal insulation layer 46 is provided. Insulation layer 46 is constructed of a suitable durable, high temperature insulating material, such as zirconium oxide, and lines the portions 20 of the cylinder head 18 defining the combustion chamber 22. The surfaces of the intake valve 24 and exhaust valve 28 may also be covered with insulating layers 48, 50, as shown. The tubing arrays 44 are affixed directly beneath the insulating layer 46.

The insulating layers 46, 48, and 50 minimize the conductive heat loss from the combustion chamber wall 22, and increase the heat available for heating of the fuel in the tubing arrays 44, as well as to reduce the heat lost by the engine.

Preferably, the heated fuel is passed into the injector 32 by directly connecting section 52 of the tubing so that the fuel is at maximum temperature just prior to injection into the engine. A minimum residence time of the fuel in the passages should be sought, so that coke deposits are reduced, since a tendency for such deposits is increased with increasing time at such temperatures. For this reason, the injector 32 preferably protrudes into the combustion chamber 22.

By this arrangement, the heating of the fuel can reach the high level necessary for hypergolic combustion, and also improve the efficiency of the engine by the regenerative nature of the fuel heating, i.e., by the use of heat energy generated by the combustion process, this energy is returned in the next combustion cycle as the previously heated fuel is combusted and performs work in the engine.

At the same time, the preheating of fuel in the exhaust passage utilizes heat energy otherwise wasted by being dissipated in the exhaust system, to reduce the energy otherwise necessary.

The heated fuel may also be partially activated to the criticial state by being passed over a catalytic bed, such as platinum metal plated surfaces, in order to augment the effect of heating on the dissassociation of the fuel molecules. Thus, the fuel activation process may be achieved by the combination of heating and by contact with the catalytic material.

Figure 4:
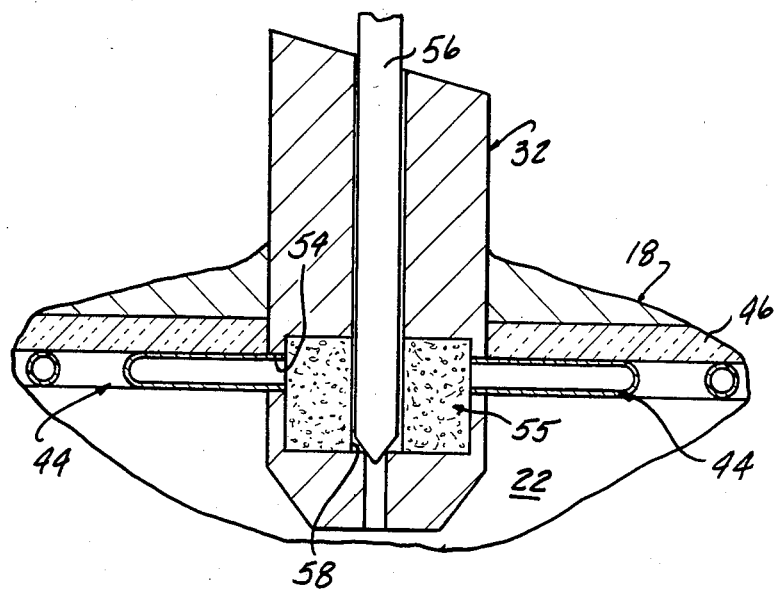
FIG. 4 is an enlarged fragmentary sectional view of a fuel injector together with a catalytic contact chamber.

One arrangement for achieving such catalytic contact is shown in FIG. 4, in which the fuel injection nozzle 32 includes a catalyst chamber 54 connected to receive the heated fuel from each of the tubing pattern arrays 44, the chamber 54 being filled with a porous body 55 having surfaces covered with a catalytic material. The resulting intimate contact of the heated fuel with the surfaces of catalytic material causes further dissociation of the heated fuel molecules.

In this embodiment, a valve member 56 is employed, cooperating with a port 58, to control the injection process by opening and closing movement of the valve member 56, the timing and duration of which is determined by the engine controls, (not shown). Thus the heating otherwise required may be somewhat reduced, because of the combined effect of regenerative heating and contact of the heated fuel with catalytic material.

It can be appreciated that other arrangements than the particular example described can be employed, such as different forms of fuel carrying vessels in the combustion chamber, different arrangements for producing contact with the catalytic material such as an injection nozzle formed of a catalytic substance.

The principle is also applicable to other forms of combustion devices and other types of internal combustion engines.

Figure 5:
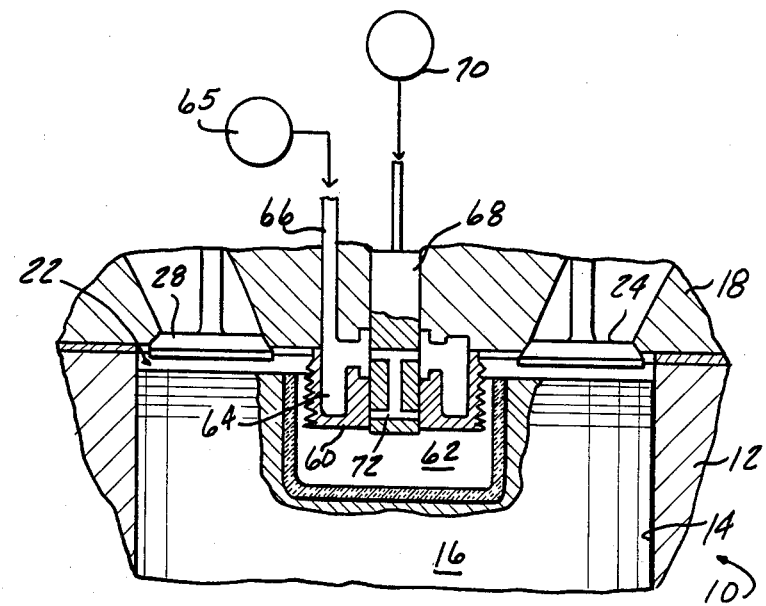
FIG. 5 is a partially sectional fragmentary view of an internal combustion engine incorporating an alternate form of an arrangement according to the present invention.

Referring to FIG. 5, an alternate arrangement is shown, in which a heat exchanger comprised of a finned body 60 is mounted to the fire deck to protrude into an auxiliary combustion chamber 62, formed in the piston 16 as the piston 16 moves up to TDC. An internal annular chamber 64 receives preheated fuel from a source 65 and passage 66 to be heated in the chamber 64 by heating of the body 60 located directly in the combustion chamber.

An injection valve 68 is controlled by an operating mechanism 70 of suitable design, which controls communication of the an injection port 72 with the combustion chamber 62 to thus control injection of heated fuel into the combustion chamber 62. The fuel is pressurized sufficiently to be injected into the air compressed in the combustion chambers 22, 62 during each engine cycle.

We claim:

1. In a reciprocating piston combustion chamber defined in part by a piston end face moving to compress air in said combustion chamber, air intake means for supplying air to said combustion chamber, fuel supply means, fuel injection means for directing fuel received from said fuel supply means into said combustion chamber, and exhaust system means for removing products of combustion from said combustion chamber, the improvement comprising heat exchanger means including a vessel disposed directly in said combustion chamber and receiving fuel from said fuel supply means immediately prior to injection, said vessel comprising an injector body having an internal cavity receiving fuel from said fuel supply means protruding into said combustion chamber towards said piston end face and formed with heat transfer fins, injector valve means within said injector body enabling controllable injection of fuel from said internal cavity;

said piston formed with a cavity extending into said end face and located to receive said injector body as said piston moves to compress air in said combustion chamber, said cavity lined with insulation material thereby said fuel in said internal chamber is heated by direct contact of said injector body with the products of combustion in said combustion chamber, whereby said fuel in said internal cavity is regeneratively heated to a temperature on the order of 1000° F. to enable hypergolic combustion upon injection into compressed air in said combustion chamber.

* * * * *